G. CHRISTENSON.
PACKING RING AND PROCESS OF MAKING SAME.
APPLICATION FILED DEC. 14, 1917.
1,273,738.
Patented July 23, 1918.
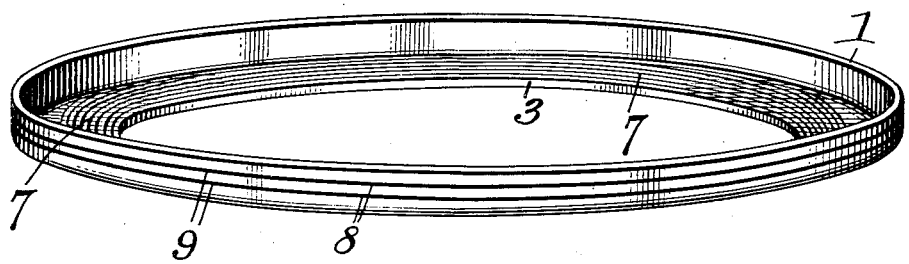
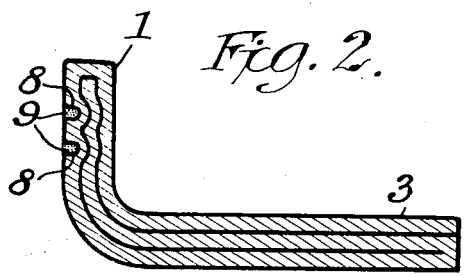 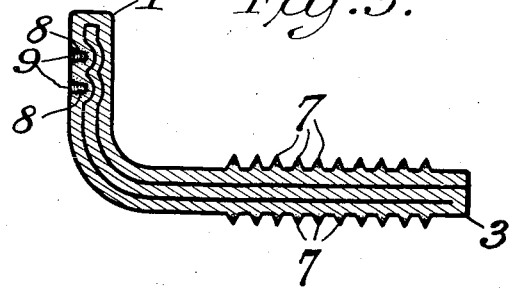
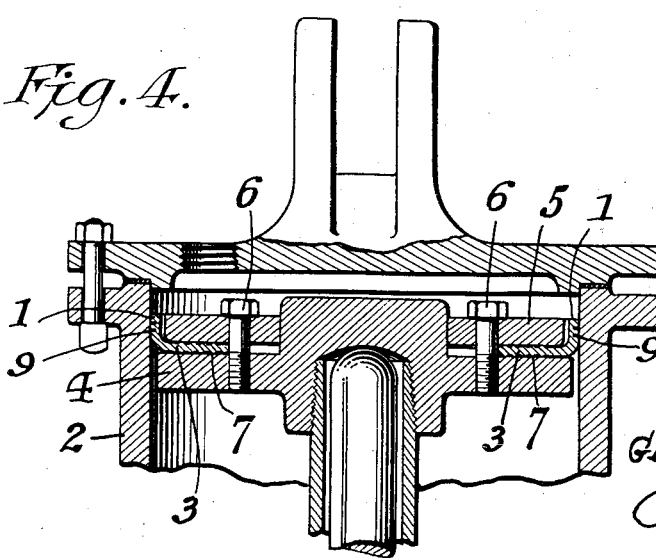
INVENTOR
George Christenson
BY
ATTORNEY

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PACKING-RING AND PROCESS OF MAKING SAME.

1,273,738.

Specification of Letters Patent. Patented July 23, 1918.

Application filed December 14, 1917. Serial No. 207,050.

*To all whom it may concern:*

Be it known that I, GEORGE CHRISTENSON, a citizen of the United States of America, residing at Jamaica, county of Queens, State of New York, have invented certain new and useful Improvements in Packing-Rings and Processes of Making Same, of which the following is a specification.

My invention relates to piston packing and processes of making same and comprises certain improvements designed to ensure the formation of a tighter joint between the piston head and the packing without diminishing the wearing qualities of other portions of the packing, and also to produce a self lubricating packing. The best form of apparatus embodying my invention at present known to me is illustrated in the accompanying sheet of drawings in which, Figure 1 is a perspective view of a cup-shaped piston packing ring embodying one form of the invention.

Fig. 2 is an enlarged cross section of such ring in the shape presented during a preliminary stage of its manufacture.

Fig. 3 is a similar cross section of the completed ring, and

Fig. 4 is an axial cross section of portions of an airbrake cylinder and piston with the packing ring applied thereto.

Throughout the drawings like reference characters indicate like parts. The cup-shaped packing ring shown has the usual cylindrical portion, or lip 1, which is held in contact with the walls of the cylinder 2, and the inwardly extending radial flange 3, which serves as a means of attachment to the piston head 4, usually through the clamping action of a piston follower 5, forced down upon the flange by bolts 6, 6.

In order to be and remain impervious to fluids under pressure, and to withstand the abrading action of constant rubbing along the cylinder walls the lip 1, of such a packing ring should be relatively hard and dense. Preferably I make the ring for this reason of asbestos fiber vulcanized under pressure. Obviously lip 1, and flange 3, should be made integral, for reasons of economy in manufacture and avoidance of leakage which would be apt to occur at any seam or other joint between the two portions. When, however, the flange 3, is made throughout of the same hard material as the lip, it is almost impossible to secure an airtight joint between it and the piston head 4, because there are inevitably certain inequalities in the surfaces of the flange or of the piston head, or in both, and if the surfaces of the flange are unyielding, there will be left spaces between the piston head and adjacent flange through which leakage will occur. If the ring as a whole is made of softer material which can be forced into such intimate contact with the piston head at every point as to leave no air spaces and so stop this leakage, such softer material renders the lip 1, more liable to collapse and much less able to withstand destructive wear on the cylinder walls.

In my invention the difficulty of the conflicting requirements is avoided by still making the ring of one integral body of material, but in so treating the same that the surfaces of the flange 3, are softer and more yielding than those of the lip 1. This result obviously may be accomplished in a variety of ways. In the form shown in the drawings it is secured by embossing a series of concentric ribs, 7, 7, on the upper and lower surfaces of the flange 3. Preferably the ring is made of asbestos cloth folded, treated with rubber, molded and vulcanized in the mold under considerable pressure. If the mold faces have grooves formed in them to produce the embossed ribs 7, 7, the fiber of the cloth forced up into them will be less dense than that in the smooth surfaces of the lip 1. Furthermore, as the rubber flows more readily than the asbestos fiber, there will be a larger percentage of rubber in said ribs, and especially at the crests of the ridges, than elsewhere in the ring. This higher percentage of rubber renders the rib, and especially the crests of the ribs, more elastic and yielding than the lip 1, which retains its characteristic hardness and density. Consequently when flange 3, is forced down on the piston head by the clamping action of the follower 5, the ribs 7, 7, will yield at all points of contact with the head and become properly deformed so as to conform to any inequalities in the piston head surface, and so afford intimate contact between ribs and piston head at every point in their circumference, thus avoiding leakage at that point. This result can be assisted by carrying the vulcanization of the flange 3, to less perfection than that of the lip 1, as by maintaining a less degree of heat at that part of the mold which contains the flange. This will leave the entire body of the flange of a softer character than the lip. The essential point, however, is to have the undersurface of the flange 3, softer and more yielding to pressure than is the outer, or wearing, surface of the lip 1. When other materials are employed, other methods for producing this result may be used.

The second feature of my invention resides in the embedding of lubricating material in and near the outer, or wearing surface of the lip of the packing ring, and also preferably in making the surfaces of the ring adjacent such masses of lubricating material less hard and dense, so that the lubricating material may partially penetrate the same and be held thereby to an extent such that the lubrication is given out slowly to the wearing surfaces.

When the preferred structure of ring composed of folded and vulcanized asbestos cloth is used, as shown in Figs. 2 and 3, the above stated result can be secured by forming one or more circumferential grooves in the outer surface of the lip as shown at 8, 8. This would be done in a preliminary, partial vulcanizing step, the fabric bending as shown in the drawings and the vulcanization being carried only far enough to insure the fabric holding the molded shape after removal from the molds. The grooves 8, 8, are then packed with dry graphite or some other dry and solid lubricating material as indicated at 9, 9, and the ring then placed in another mold and subjected to pressure such as will upset, or shorten the lip 1, and collapse the grooves 8, 8, as shown in Fig. 3. This will force a portion of the graphite into the walls of the groove and force some of the rubber into the adjacent surfaces of the graphite body, as indicated by the stippling in Fig. 3. The general vulcanization of the ring as a whole is completed in this second mold with the graphite still in the grooves. The result will be that the walls of grooves 8, 8, will be vulcanized to a less degree than are the exposed surfaces of the ring because the graphite bodies will prevent the same amount of heat reaching such walls. These walls, and the exuded, partly vulcanized rubber mingled with the graphite, will therefore form matrices for holding the thin layers of graphite left in the collapsed grooves and this supply of graphite will serve for constant lubrication of the cylinder walls and exterior surface of lip 1, which lubrication will persist at least until the cylindrical surface of the lip is worn down to and beyond the bottoms of grooves 8, 8. As these asbestos rings, when properly made, resist wear almost indefinitely, the result is an almost everlasting, self lubricating packing ring.

The advantages of the invention can be easily realized when one reflects on the labor and expense involved in the frequent renewals and relubrications necessary with the use of the ordinary cup leathers in air brake systems, and the ill effects of grease and oil used as fluid lubricants in collecting grit, gumming up the triple valves and disintegrating the packing rings.

Having described my invention, I claim:

1. A cup-shaped ring of piston packing the surface of the radially disposed flange of which is softer than is the cylindrical lip portion of the ring.

2. A cup-shaped ring of piston packing made of yielding but tough material, the radially disposed flange of which has embossed ribs on certain of its surfaces.

3. A cup-shaped ring of piston packing made of vulcanized rubber and fiber, the radially disposed flange of which has concentric ribs embossed on certain of its surfaces, said ribs containing a larger percentage of rubber than do other portions of the ring body.

4. A cup-shaped ring of piston packing made of vulcanized rubber and fiber, the radially disposed flange of which has concentric ribs embossed on certain of its surfaces, said ribs being less dense in structure than is the lip of the ring.

5. A piston packing ring of yielding material having a collapsed groove in the outer cylindrical surface of the ring and a body of lubricating material gripped in said collapsed groove.

6. A piston packing ring of yielding material having a collapsed groove in the outer cylindrical surface of the ring and a body of dry, solid lubricating material gripped in said collapsed groove.

7. A piston packing ring of yielding material having a collapsed groove in the outer cylindrical surface of the ring and a body of graphite gripped in said collapsed groove.

8. A piston packing ring formed of vulcanized fiber, the outer cylindrical surface of which has a circumferential groove and a body of lubricating material packed in said groove, the material of the walls of said groove being vulcanized to a less degree than are the exterior walls of the ring.

9. A piston packing ring formed of vulcanized fiber, the outer cylindrical surface of which has a circumferential groove and a body of dry, solid libricating material packed in said groove, the material of the walls of said groove being vulcanized to a less degree than are the exterior walls of the ring.

10. A piston packing ring of vulcanized fibrous material having certain of its outer portions vulcanized to a less degree than other portions and solid lubricating material held in intimate contact with said less vulcanized portions, 11. The process of forming a self-lubricating piston-packing ring which comprises the following steps: first, molding a ring of fiber and rubber with a circumferential exterior groove in the outer face thereof; second, packing said groove with a lubricating material before the vulcanization of the ring is completed; third, compressing said ring in a die so as to collapse the walls of the groove upon the contained lubricant, and fourth, completing the vulcanization of the ring in that condition.

GEORGE CHRISTENSON.